Jan. 15, 1946.   C. A. ATWELL   2,393,012
CONTROL SYSTEM
Filed Aug. 25, 1944

WITNESSES:

INVENTOR
Clarence A. Atwell.
BY
ATTORNEY

Patented Jan. 15, 1946

2,393,012

UNITED STATES PATENT OFFICE 2,393,012

CONTROL SYSTEM

Clarence A. Atwell, Pittsburgh, Pa., assignor to Westinghouse Electric Corporation, East Pittsburgh, Pa., a corporation of Pennsylvania Application August 25, 1944, Serial No. 551,116

8 Claims. (Cl. 171—223)

The present invention relates to direct-current generators and, more particularly, to a direct-current generator intended to be driven by an internal combustion engine. The invention is especially applicable to generators driven by Diesel engines, such as the generators used on Diesel-electric locomotives, although it is obviously not restricted to this particular application and may be used in any engine-driven generator. Similar subject matter is found in applicant's copending application 551,115 filed of even date.

In order to obtain the maximum power and, therefore, the most satisfactory operation, from a Diesel engine operating at full throttle, the engine must run at substantially constant speed. When such an engine is used to drive an electric generator, this means that the generator characteristics must be such that it requires a substantially constant power input over most or all of the range of generator load current. Thus, if the power input required by the generator increases when the generator load current increases, the engine driving the generator is overloaded, and its speed drops with resultant decrease in power, so that the engine labors. If the power input to the generator decreases when the generator load current drops, the speed of the engine will increase, so that it races unless it is provided with a governor which reduces the power to prevent overspeeding. Thus, in order to obtain the most desirable engine performance by substantially constant-speed operation, the generator should require substantially constant power input from its prime mover over most or all of the expected range of generator load currents.

In order to satisfy this condition of constant power input with varying load current in a direct-current generator, the generator voltage must vary with the load current in such a manner that the product of generator voltage and load current, divided by the efficiency at the particular load current, remains substantially constant over the full normal range of generator load current. Variation of the generator voltage in this manner can most readily be obtained by controlling the generator excitation so as to cause the voltage to vary in the desired manner as the current varies. This result can be obtained by using a separate exciter for exciting the generator field winding, and controlling the excitation of the exciter by means of a suitable regulator so that the generator excitation is controlled in the desired manner. Such a special exciter with its associated regulator and control equipment, however, adds considerably to the cost of the complete generator installation and also occupies considerable space, so that this solution of the problem is not suitable for relatively small generators such as are used on switch engines, for example.

The principal object of the present invention is to provide a direct-current generator in which the field excitation is controlled so as to approach a condition of constant load on the prime mover which drives the generator over a relatively wide range of generator load current.

Another object of the invention is to provide a method and means for controlling the field excitation of a direct-current generator in a simple and inexpensive manner so as to closely approximate the excitation required for constant load on the prime mover as the generator load current varies over a relatively wide range.

A further object of the invention is to provide a direct-current generator having a main self-excited field winding and a separately excited auxiliary field winding, in which the auxiliary field excitation is controlled in such a manner that the resultant excitation of the generator closely approximates the excitation required for constant power input.

A more specific object of the invention is to provide a direct-current generator having a main self-excited field winding and a separately excited auxiliary field winding, in which the auxiliary field excitation is controlled so that it adds to the main field excitation at low generator voltages and at high generator voltages, and subtracts from the main field excitation at intermediate generator voltages, so that the resultant excitation of the generator closely approximates the excitation required for constant power input.

The invention will be more fully understood from the following detailed description, taken in connection with the accompanying drawing, in which.

Figure 1:
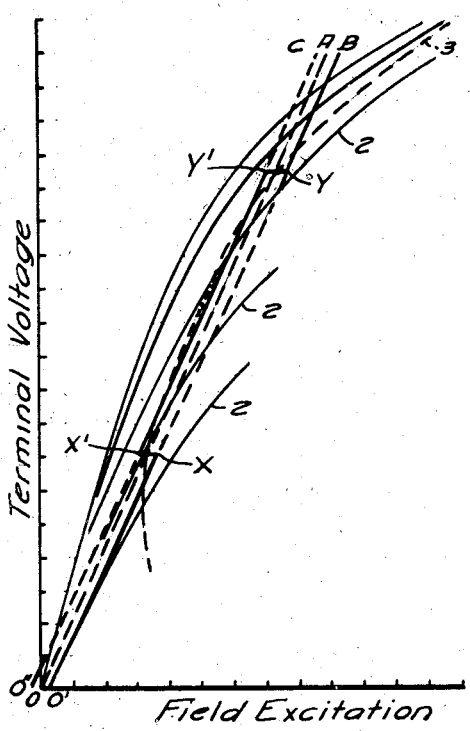
Figures 1 and 2 are explanatory diagrams.
Figure 2:
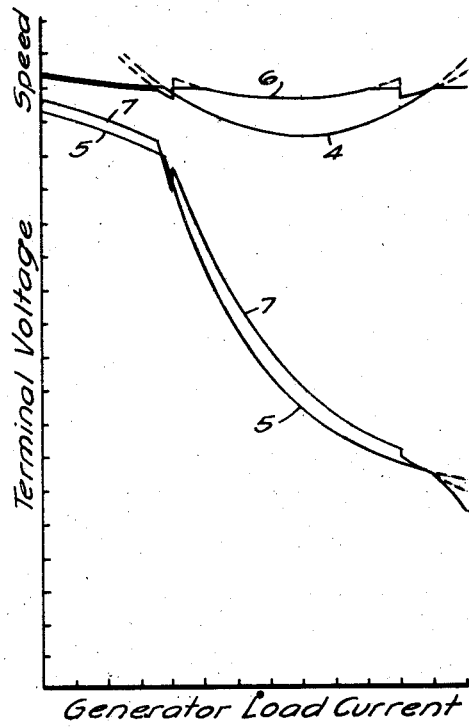

A complete understanding of the invention will be facilitated by first considering the curves of Figures 1 and 2. In Fig. 1, there are shown the no-load saturation curve 1 of a typical direct-current generator, and a family of load saturation curves 2 showing the characteristics at various load currents. There are also shown in Fig. 1 several excitation lines or curves, that is, curves showing the relation between the generator terminal voltage and the corresponding field excitation obtained at any voltage. The dotted curve 3 shows the theoretical field excitation characteristic required to cause the generator voltage to vary as the load current changes in the manner required for constant power input to the generator. In other words, this curve shows the value of voltage required at each load current for constant power input, and the corresponding field excitation required to produce that voltage. Since the excitation characteristic 3 is a curved line, it is obvious that the desired constant power input can not be obtained, or closely approximated, by a self-excited shunt generator of the conventional type, in which the excitation varies directly with the generator voltage in the manner shown by the straight line OA.

Small engine-driven generators have been used having self-excited shunt excitation with the slope of the excitation line OA adjusted by means of the field rheostat so that it intersects the theoretical excitation curve 3 at two points within the expected range of generator load. It will be apparent from Fig. 1, however, that such an arrangement is not satisfactory, since the generator has too much excitation at voltages between the points of intersection of the line OA with the curve 3, so that in this range the driving engine is overloaded and its speed drops. At voltages above and below these points of intersection, the generator has insufficient excitation so that the engine is underloaded and the speed rises. This effect is illustrated by the curve 4 in Fig. 2, which shows the variation in speed of the driving engine of a shunt-excited generator with varying load current. It will be seen that the speed drops markedly in the intermediate portion of the load range and rises at high and low load currents, the dotted portions of the curve indicating the manner in which the speed would increase, while the solid end portions of the curve show the effect of a governor in holding the speed down, which, of course, means reduced engine power. The corresponding voltage regulation of the generator is shown by the curve 5 in Fig. 2.

In accordance with the present invention, it is proposed to provide a much closer approximation to the theoretical excitation curve 3 than can be obtained with a completely self-excited generator as described above. This result is obtained by providing the generator with a main component of excitation which varies directly with the generator voltage as shown by the line OA, and which can conveniently be provided by a self-excited shunt field winding. In addition, a smaller, auxiliary, substantially constant component of excitation is also provided, and controlled so that it can be made to either add to the excitation of the self-excited field or subtract from it. Thus, if the constant auxiliary component of excitation is added to the main component OA, an excitation line O'B results, while if the constant auxiliary component of excitation subtracts from the main excitation OA, an excitation line O"C is obtained. In order to obtain a close approximation to the theoretical excitation curve 3, the auxiliary excitation component is controlled so that it adds to the main excitation OA at generator voltages below a predetermined value, indicated at X, and at generator voltages above a higher predetermined value, indicated at Y. The voltages corresponding to the points X and Y should be substantially the voltages corresponding to the points of intersection of the line OA with the curve 3. At voltages between these two values, the auxiliary component of excitation is reversed so as to subtract from the main excitation OA. Thus the resultant excitation of the generator follows the solid line O'XX'Y'YB in Fig. 1. It will be apparent that this excitation curve gives a very close approximation to the theoretical excitation curve 3 over most of the range of generator load. The effect of this excitation characteristic is shown by the curve 6 in Fig. 2, which shows the speed of an engine driving a generator in which the excitation is controlled in this manner. As in curve 4, the dotted portions of curve 6 show the ungoverned speed. It will be seen that the speed of the engine is kept very close to a constant value, and tends to rise only at very light loads and at very heavy loads which are beyond the usual range of operation. The curve 7 shows the corresponding voltage regulation, and the improvement over the voltage regulation of curve 5 is evident.

Figure 3:
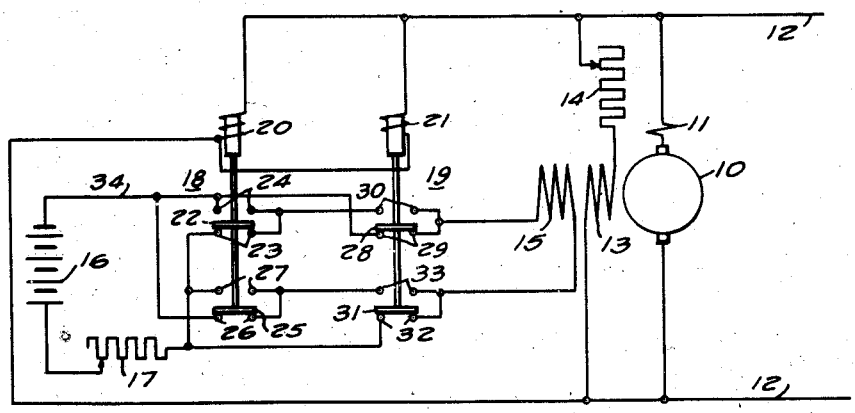
Fig. 3 is a schematic wiring diagram showing a preferred embodiment of the invention.

Fig. 3 shows a preferred arrangement for obtaining the excitation characteristic described above. This figure shows a direct-current generator 10, having a series-connected commutating winding 11, and connected to supply a load circuit 12. The generator has a main shunt field winding 13, which is connected across the generator terminals in series with a field rheostat 14 so as to be self-excited. Thus, the excitation of the main field winding 13 is directly proportional to the generator voltage, as shown by the line OA in Fig. 1, and the slope of the excitation line may be adjusted by adjustment of the rheostat 14.

The generator 10 also has an auxiliary field winding 15 which is supplied from a separate, substantially constant-voltage source, such as a battery 16. An adjustable resistor 17 may be connected in series between the auxiliary field winding 15 and the battery 16 to control the magnitude of the current. The connection of the auxiliary field winding 15 to the battery 16 is controlled by two voltage relays 18 and 19, having operating coils 20 and 21, respectively, which are connected in parallel across the generator voltage. The relays 18 and 19 are shown in their deenergized positions. The relay 18 has an upper contact 22 adapted to bridge stationary contacts 23 in the deenergized position of the relay, and stationary contacts 24 in the energized position. The relay 18 also has a lower contact 25 adapted to bridge fixed contacts 26 in the deenergized position of the relay and fixed contacts 27 in the energized position. Similarly, the relay 19 has an upper contact 28 adapted to bridge fixed contacts 29 in the deenergized position of the relay and fixed contacts 30 in the energized position, and a lower contact 31 adapted to bridge fixed contacts 32 in the deenergized position and fixed contacts 33 in the energized position. The relay 18 is adjusted to be energized and move its contacts 22 and 25 from the lower to the upper sets of fixed contacts at a voltage corresponding to the voltage Y of Fig. 1, and the relay 19 is adjusted to move its contacts from the deenergized position to the energized position at a voltage corresponding to the voltage X of Fig. 1.

The operation of this system is as follows. When the generator is at rest, or operating at a heavy load current with a voltage below the value corresponding to the point X of Fig. 1, the relays 18 and 19 are both in their deenergized positions, as shown in the drawing. The main field winding 13 is excited from the generator voltage, and the auxiliary field winding 15 is excited from the battery 16, current flowing from the battery through the resistor 17, contacts 31 and 32 of relay 19, auxiliary field winding 15, contacts 29 and 28 of relay 19, and conductor 34 back to the battery. The auxiliary field winding 15 is wound so that when both relays are in their deenergized positions, the direction of the current in the field winding 15 is such that its flux adds to the flux of the current in the main field winding 13. Under these conditions, therefore, the resultant generator excitation follows the line O'B of Fig. 1.

If the generator load decreases, its voltage rises until it reaches a value corresponding to the point X. At this voltage, the relay 19 is energized, and moves its contacts 28 and 31 from the lower to the upper sets of fixed contacts. In this position of the relay 19, the relay 18 being still deenergized, current flows from the battery through the resistor 17, contacts 22 and 23 of relay 18, contacts 28 and 30 of relay 19, the auxiliary field winding 15, contacts 33 and 31 of relay 19, contacts 26 and 25 of relay 18, and conductor 34 back to the battery. It will be seen that the direction of current flow in the auxiliary winding 15 has been reversed, so that its flux subtracts from the flux of the main field winding 13, and the excitation follows the line O''C of Fig. 1.

As the generator load further decreases, its voltage rises until it reaches the value corresponding to the voltage Y of Fig. 1. At this point, the relay 18 is energized, and moves its contacts 22 and 25 from the lower to the upper sets of fixed contacts, so that both relays are now in the energized position. Current now flows from the battery 16 through the resistor 17, contacts 27 and 25 of relay 18, contacts 33 and 31 of relay 19, auxiliary field winding 15, contacts 30 and 28 of relay 19, contacts 24 and 22 of relay 18, and conductor 34 back to the battery. It will be seen that the direction of current flow in the auxiliary field winding 15 has again been reversed, so that it is now in the original direction, and its flux again adds to the flux of the main field winding 13. The resultant excitation, therefore, again follows the line O'B. It will be apparent that the resultant excitation of the generator, over the whole range of voltage, follows the solid excitation line in Fig. 1, since the flux of the auxiliary field winding 15 adds to the main field flux at voltages below the point X and above the point Y, and subtracts from the main field flux at intermediate voltages. In this way, the resultant excitation of the generator 10 closely approximates the theoretical excitation curve 3 required for constant power input to the generator.

It should now be apparent that a simple and inexpensive means has been provided for controlling the excitation of a direct-current generator to cause the generator voltage to vary as the load current changes in the manner necessary to closely approach a condition of constant load on the prime mover which drives the generator, and that this result is accomplished without requiring any special exciter or regulator, and by using only two simple voltage relays with a suitable source of separate excitation for supplying a small auxiliary component of excitation.

A preferred arrangement for obtaining the desired result has been shown in Fig. 3, and described above for the purpose of illustration, but it is to be understood that other arrangements might be used within the scope of the invention for obtaining an excitation characteristic such as that shown in Fig. 1. The specific embodiment of the invention shown in Fig. 3 is also capable of modification. Thus, a battery has been illustrated as a substantially constant-voltage source of separate excitation for the auxiliary field winding 15, but it will be obvious that any other suitable voltage source, such as a small constant-voltage pilot generator, might equally well be used. It is to be understood, therefore, that the invention is not restricted to the particular embodiment shown and described, but in its broadest aspects, it includes all equivalent embodiments and modifications which come within the scope of the appended claims.

I claim as my invention:

1. A direct-current generator having means for providing a component of field excitation which is substantially proportional to the generator voltage, means for providing a substantially constant component of field excitation, and means for causing said last-mentioned component of excitation to add to the first-mentioned component when the generator voltage is below a first predetermined value or above a second predetermined value, and for causing the last-mentioned component of excitation to subtract from the first-mentioned component when the generator voltage is between said predetermined values.

2. A direct-current generator having means for providing a component of field excitation which is substantially proportional to the generator voltage, means for providing a substantially constant component of field excitation, said constant component of excitation adding to the first-mentioned component when the generator voltage is below a first predetermined value, means for reversing the constant component of excitation when the generator voltage exceeds said predetermined value, and means for again reversing the constant component so that it again adds to the first-mentioned component of excitation when the generator voltage exceeds a second, higher predetermined value.

3. A direct-current generator having a main self-excited field winding, an auxiliary field winding, means for supplying substantially constant excitation to said auxiliary field winding, and means for causing the auxiliary field excitation to add to the main field excitation when the generator voltage is below a first predetermined value or above a second predetermined value, and for causing the auxiliary field excitation to subtract from the main field excitation when the generator voltage is between said predetermined values.

4. A direct-current generator having a main self-excited field winding, an auxiliary field winding, means for supplying substantially constant excitation to said auxiliary field winding, and relay means responsive to the generator voltage for causing the auxiliary field excitation to add to the main field excitation when the generator voltage is below a first predetermined value or above a second predetermined value, and for causing the auxiliary field excitation to subtract from the main field excitation when the generator voltage is between said predetermined values.

5. A direct-current generator having a main self-excited field winding, an auxiliary field winding, a substantially constant-voltage source for supplying excitation to said auxiliary field winding, means for connecting the auxiliary field winding to said source so that the auxiliary field excitation adds to the main field excitation when the generator voltage is below a predetermined value, said connecting means including means for effecting reversal of the connection of the auxiliary field winding to the source when the generator voltage exceeds said predetermined value, so that the auxiliary field excitation subtracts from the main field excitation, and for effecting further reversal of the connection of the auxiliary field winding to the source when the generator voltage exceeds a second, higher predetermined value, so that the auxiliary field excitation again adds to the main field excitation.

6. A direct-current generator having a main self-excited field winding, an auxiliary field winding, a substantially constant-voltage source for supplying excitation to said auxiliary field winding, means for connecting the auxiliary field winding to said source so that the auxiliary field excitation adds to the main field excitation when the generator voltage is below a predetermined value, said connecting means including relay means responsive to the generator voltage for effecting reversal of the connection of the auxiliary field winding to the source when the generator voltage exceeds said predetermined value, so that the auxiliary field excitation subtracts from the main field excitation, and for effecting further reversal of the connection of the auxiliary field winding to the source when the generator voltage exceeds a second, higher predetermined value, so that the auxiliary field excitation again adds to the main field excitation.

7. A direct-current generator having a main self-excited field winding, an auxiliary field winding, a substantially constant-voltage source for supplying excitation to said auxiliary field winding, means for connecting the auxiliary field winding to said source so that the auxiliary field excitation adds to the main field excitation when the generator voltage is below a predetermined value, a first relay responsive to the generator voltage, said first relay being adapted to effect reversal of the auxiliary field excitation when the generator voltage exceeds said predetermined value, whereby the auxiliary field excitation is caused to subtract from the main field excitation, and a second relay responsive to the generator voltage, said second relay being adapted to effect a further reversal of the auxiliary field excitation when the generator voltage exceeds a second, higher predetermined value, whereby the auxiliary field excitation again adds to the main field excitation when the generator voltage is above said second predetermined value.

8. A direct-current generator having a main self-excited field winding, an auxiliary field winding, a substantially constant-voltage source for supplying excitation to said auxiliary field winding, first and second voltage-responsive relays, said relays having contacts for effecting connection of said auxiliary field winding to said source, said relays being adapted to connect the auxiliary field winding to the source so that the auxiliary field excitation adds to the main field excitation when the generator voltage is below a predetermined value, said first relay being adapted to reverse the connection of the auxiliary field winding when the generator voltage rises above said predetermined value, whereby the auxiliary field excitation subtracts from the main field excitation, and said second relay being adapted to further reverse the connection of the auxiliary field winding when the generator voltage exceeds a second, higher predetermined value, whereby the auxiliary field excitation again adds to the main field excitation.

CLARENCE A. ATWELL.